US007475228B2

(12) United States Patent
Moir et al.

(10) Patent No.: US 7,475,228 B2
(45) Date of Patent: Jan. 6, 2009

(54) ENSURING PROGRESS IN A SYSTEM THAT SUPPORTS EXECUTION OF OBSTRUCTION-FREE OPERATIONS

(75) Inventors: Mark S. Moir, Hampton, NH (US); Victor M. Luchangco, Cambridge, MA (US); Nir N. Shavit, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 298 days.

(21) Appl. No.: 11/325,062

(22) Filed: Jan. 3, 2006

(65) Prior Publication Data

US 2007/0157202 A1 Jul. 5, 2007

(51) Int. Cl.
*G06F 9/52* (2006.01)
(52) U.S. Cl. ....................................... 712/220
(58) Field of Classification Search ................. 712/220; 718/104
See application file for complete search history.

(56) References Cited

U.S. PATENT DOCUMENTS

| | | | | |
|---|---|---|---|---|
| 5,991,821 A * | 11/1999 | Badovinatz et al. | ......... | 719/310 |
| 6,006,247 A * | 12/1999 | Browning et al. | ........... | 718/102 |
| 6,223,204 B1 * | 4/2001 | Tucker | ....................... | 718/103 |
| 6,662,364 B1 * | 12/2003 | Burrows et al. | ............. | 718/102 |
| 6,754,764 B1 * | 6/2004 | Perloff | ........................ | 711/100 |
| 6,826,754 B1 * | 11/2004 | Miller | ........................ | 718/104 |
| 6,941,365 B2 * | 9/2005 | Sirgany | ...................... | 709/223 |
| 7,343,476 B2 * | 3/2008 | Floyd et al. | .................. | 712/216 |
| 7,389,453 B2 * | 6/2008 | Udell | ......................... | 714/724 |

OTHER PUBLICATIONS

Publication: "*Obstruction-Free Synchronization: Double-Ended Queues as an Example*", by Herlihy et al. ICDCS, Proceedings of the 23rd International Conference on Distributed Computing Systems, 2003, p. 522, ISNB: 0-7695-1920-2.
Publication: "*Software Transactional Memory for Dynamic-Sized Data Structures*" by Herlihy et ela., Annual ACM Symposium on Principles of Distributed Computing Proceedings of the twenty-second annual symposium on Principles of Distributed Computing, 2003, pp. 92-101, ISBN:1-58113-708-7.

(Continued)

*Primary Examiner*—Eric Coleman
(74) *Attorney, Agent, or Firm*—Park, Vaughan & Fleming LLP (57) ABSTRACT

One embodiment of the present invention provides a system that ensures that progress is made in an environment that supports execution of obstruction-free operations. During execution, when a process $p_i$ invokes an operation, the system checks a panic flag, which indicates whether a progress-ensuring mechanism is to be activated. If the panic flag is set, the progress-ensuring mechanism is activated, which causes the system to attempt to perform the operation by coordinating actions between processes to ensure that progress is made in spite of contention between the processes. On the other hand, if the panic flag is not set, the system attempts to perform the operation essentially as if the progress-ensuring mechanism were not present. In this case, if there is an indication that contention between processes is impeding progress, the system sets the panic flag, which causes the progress-ensuring mechanism to be activated so that processes will coordinate their actions to ensure that progress is made.

23 Claims, 2 Drawing Sheets

OTHER PUBLICATIONS

Publication: "*Time-Adaptive Algorithms for Synchronization*", by Alur et al., SIAM Journal of Computing, vol. 26, No. 2: pp. 539-556, 1997.

Publication: "*Consensus in the Presence of Partial Synchrony*", by C. Dwark et al., J.ACM, vol. 35, No. 2, pp. 288-323, 1988.

Publication: "*Adaptive Backoff Synchronization Techniques*", by Agarwal et al., Proceedings of the 16th International Symposium on Computer Architecture, pp. 396-406, May 1989.

Publication: "*Unreliable Failure Detectors for Reliable Distributed Systems*", by Tushar Deepak Chandra et al., Journal of the Association for Computing Machinery, vol. 43, No. 2, Mar. 1996. http://www.cs.cornell.edu/home/sam/FDpapers/CT96-JACM.ps.

Publication: "*Wait-Free Synchronization*" by M. Herlihy, Digital Equipment Corporation, ACM Transactions on Programming Languages and Systems, vol. 11, No. 1, Jan. 1991, pp. 124-149.

Publication: "*Space-and Time-Adaptive Nonblocking Algorithms*", by M. Herlihy et al., Electr. Notes Theor. Comput. Sci. 78, 2003, http://research.sun.com/scalable/Papers/CATS2003.pdf.

Publication: "*The ABCD'S of PAXOS*", by Butler Lampson, Annual ACM Symposium on Principles of Distributed Computing Proceedings of the Twentieth Annual ACM Symposium on Principles of Distributed Computing, 2001, p. 13, ISBN: 1-58113-383-9.

Publication: "*Contention Management in Dynamic Software Transactional Memory*", by William Scherer et al., Department of Computer Science, http://www.cs.rochester.edu/scherer/papers/2004-CSJP-CM.pdf.

* cited by examiner

ENSURING PROGRESS IN A SYSTEM THAT SUPPORTS EXECUTION OF OBSTRUCTION-FREE OPERATIONS

BACKGROUND

1. Field of the Invention

The present invention generally relates to computer systems that support parallel-processing. More specifically, the present invention relates to a method and an apparatus for ensuring that progress is made in a system that supports execution of obstruction-free operations.

2. Related Art

Substantial effort has been made over the last decade to design nonblocking shared data structure implementations, which aim to overcome the numerous problems associated with lock-based implementations. Despite this effort, designs satisfying traditional nonblocking progress conditions, such as wait-freedom, and to a lesser extent lock-freedom, are usually complicated and expensive.

Significant progress in overcoming these problems has been achieved recently by designing implementations that satisfy the weaker "obstruction-free" nonblocking progress condition, which requires progress guarantees only in the (eventual) absence of interference from other operations. (See [Herlihy2003A] M. Herlihy, V. Luchangco, and M. Moir. Obstruction-free synchronization: Double-ended queues as an example. In *Proc. 23rd International Conference on Distributed Computing Systems*, 2003.) This weaker requirement allows simpler implementations that perform better in the common uncontended case. Recently, Herlihy, Luchangco, Moir and Scherer introduced a dynamic software transactional memory (DSTM) package, which allows programmers to develop obstruction-free data structures without reasoning about concurrency. (See [Herlihy2003B] M. Herlihy, V. Luchangco, M. Moir, and W. N. Scherer III. Software transactional memory for supporting dynamic-sized data structures. In *Proc. 22nd Annual ACM Symposium on Principles of Distributed Computing*, pages 92-101, 2003.)

The fact that obstruction-free data structures do not guarantee progress under contention is not just a theoretical concern: they are observed to suffer from livelock in practice. To combat this problem, obstruction-free implementations have been combined with contention managers [Herlihy2003B], whose role is to facilitate progress when necessary by allowing operations to run without interference long enough to complete. While a number of contention managers have proved effective in practice, so far none guarantees progress.

Hence, what is needed is a method and an apparatus that facilitates guaranteeing progress in a system that supports execution of obstruction-free operations.

SUMMARY

One embodiment of the present invention provides a system that ensures that progress is made in an environment that supports execution of obstruction-free operations. During execution, when a process $p_i$ invokes an operation, the system checks a panic flag, which indicates whether a progress-ensuring mechanism is to be activated. If the panic flag is set, the progress-ensuring mechanism is activated, which causes the system to attempt to perform the operation by coordinating actions between processes to ensure that progress is made in spite of contention between the processes. On the other hand, if the panic flag is not set, the system attempts to perform the operation essentially as if the progress-ensuring mechanism were not present. In this case, if there is an indication that contention between processes is impeding progress, the system sets the panic flag, which causes the progress-ensuring mechanism to be activated so that processes will coordinate their actions to ensure that progress is made.

In a variation on this embodiment, the panic flag is set if the process $p_i$ fails to perform the operation after a predetermined number of steps.

In a variation on this embodiment, attempting to perform the operation by coordinating actions between processes involves using time stamps for the processes to substantially serialize execution of the processes. For example, this can involve first acquiring a time stamp $T[i]$ for the process $p_i$ by executing an atomic operation, which ensures that all processes acquire unique time stamps, and then setting an activity counter $A[i]$ for the process $p_i$ to an initial value. Next, the system uses the time stamps and the activity counters for the processes to substantially serialize execution of the processes. This involves iteratively determining which process has the minimum time stamp. If $p_i$ has the minimum time stamp, the system repeatedly: performs up to a pre-specified number, b, steps of the operation; increases the activity counter $A[i]$ for $p_i$; and sets the panic flag, until the operation completes or $T[i]$ is overwritten by another process. Otherwise, if the process $p_i$ determines that another process $p_k$ has the minimum time stamp, the system repeatedly waits $A[k]$ steps until $T[k]$ is overwritten or $A[k]$ is not increased, wherein if $A[k]$ is not increased the system replaces $T[k]$ with $\infty$.

In a further variation, determining which process has the minimum time stamp involves replacing all time stamps that are larger than the minimum time stamp with $\infty$.

In a further variation, if the operation being performed by process $p_i$ completes, the system: unsets the panic flag; sets $T[i]$ to $\infty$; and returns from the invocation of the operation.

In a variation on this embodiment, the system is a shared-memory multiprocessor system which supports concurrently executing processes.

BRIEF DESCRIPTION OF THE FIGURES

Table 1 presents code that invokes an operation for a process in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Exemplary Multiprocessor System

Figure 1:
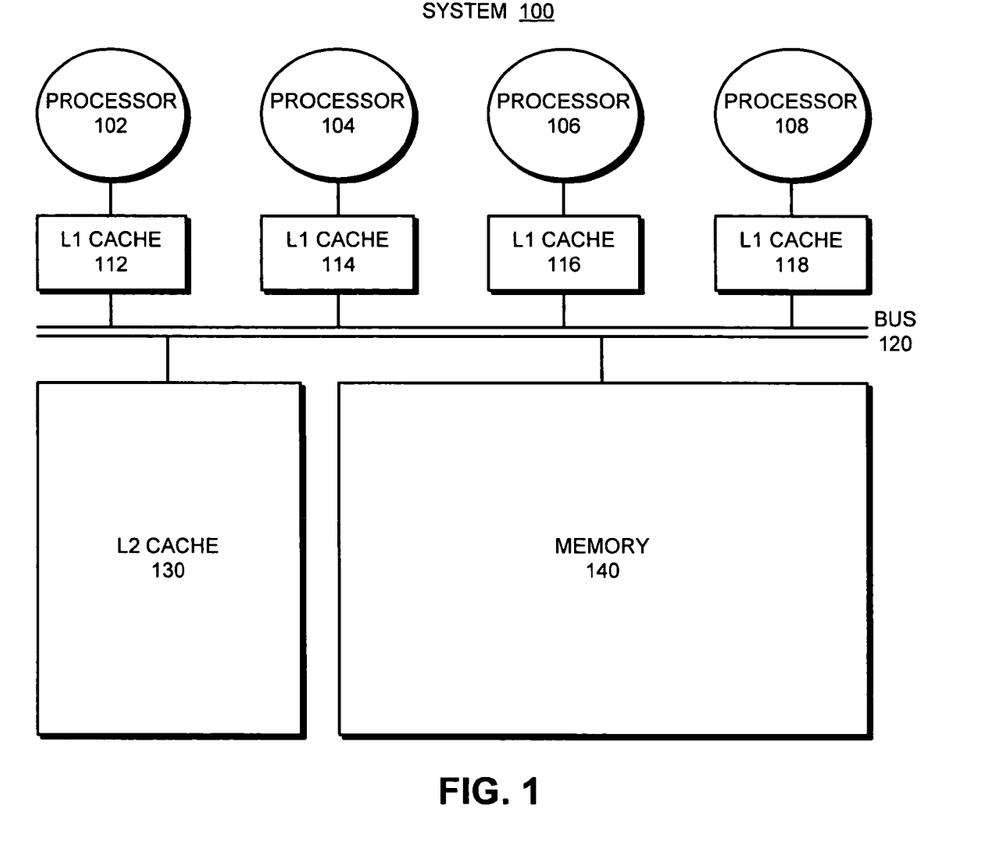
FIG. 1 illustrates a shared-memory multiprocessor system in accordance with an embodiment of the present invention.

FIG. 1 illustrates an exemplary multiprocessor system 100 upon which the present invention can operate. Multiprocessor system 100 includes processors 102-108 coupled to L1 caches 112-118 respectively. L1 caches 112-118 are coupled to bus 120. L2 cache 130 and memory 140 are also coupled to bus 120. In the embodiment of the present invention illustrated in FIG. 1, L2 cache 130 is shared between processors 102-108.

Note that the present invention is not limited to multiprocessor system 100 illustrated in FIG. 1, but in general can be applied to any computing environment or system capable of supporting multiple processes.

There are a number of methods for implementing the progress-ensuring features of the present invention. For example, these features can be implemented through automatic translation (e.g., compiler), virtual machine control (e.g., safe points), or hand translation. These features can also be built into libraries, or contention managers. To elaborate on the last point, it is possible to provide a "base" contention manager that implements the progress-ensuring mechanism of the present invention, but also allows a user-specified ad hoc contention manager to be used until some event indicates that a progress-ensuring mechanism should be invoked. Hence, there are many ways of going from an obstruction-free application and an ad hoc contention management strategy to one that ensures progress in practice, and the present invention should not be viewed as being limited to a particular one of these ways.

Additionally, the present invention is also applicable to obstruction-free applications that are produced using software transactional memory implementations.

Approach

We now show how to transform any obstruction-free application to guarantees that every operation eventually completes, given some very weak timing assumptions about the target system. These assumptions are embodied by the unknown-bound semisynchronous model of computation. (See C. Dwork, N. Lynch, and L. Stockmeyer. Consensus in the presence of partial synchrony. J.ACM, 35(2):288-323, 1988.) Roughly speaking, this model assumes that some bound exists on the relative execution rates of any two processes in the system, but does not assume that the bound is known. Note that all practical systems satisfy this assumption.

Our transformation does not affect the behavior of the original application (except for a very small overhead) until some operation decides that it has run for too long without completing. Furthermore, our transformation can be applied to an obstruction-free application combined with any valid contention manager (i.e., one that preserves the obstruction-freedom of the application; see [Herlihy2003B] for restrictions on contention managers), allowing us to take advantage of the practical benefits of a heuristic contention manager that does not guarantee progress, without sacrificing progress guarantees.

Considering obstruction-free implementations significantly reduces the burden on designers of data structures (and software transactional memory implementations) by eliminating the need to ensure progress under contention. Furthermore, designers of contention managers for obstruction-free implementations have a great deal of latitude because contention managers can change the timing behavior of an execution arbitrarily without causing safety requirements to be violated. This is because the obstruction-free implementations are proved safe in an asynchronous model of computation, in which processes may execute arbitrarily fast or slow or even stop executing altogether. Therefore, contention manager designers are free to experiment with a wide range of heuristics for controlling contention, and in particular can exploit timing information available in the target system, for example to delay an operation to prevent it from interfering with another.

BACKGROUND

Before presenting our transformation, we introduce background on nonblocking shared data structures, nonblocking progress conditions, and asynchronous and semisynchronous models of computation, and briefly describe some previous results that use semisynchronous models to analyze implementations.

Nonblocking Shared Data Structures

Today, almost all concurrent programs rely on blocking constructs such as mutual exclusion locks for synchronizing access to shared data structures. The use of locks introduces numerous problems, including deadlock, performance bottlenecks, and priority inversion. Researchers have investigated nonblocking implementations in the hope of eliminating these problems.

An implementation of a shared data structure in a shared memory system provides a representation of the data structure using base objects in the system and provides techniques for the processes of the system to perform operations on the data structure.

Most nonblocking applications are based on an optimistic approach to synchronization, in which an operation is attempted but may fail to take effect if another concurrent operation interferes. In this case, the operation is retried. A significant source of difficulty is guaranteeing that an operation is not retried repeatedly without ever completing. Generally, stronger nonblocking progress guarantees are more difficult to achieve, and require techniques that are more complicated and more expensive.

Nonblocking Progress Conditions

A wait-free implementation guarantees that when a process performs an operation, it completes the operation in a finite number of its own steps, regardless of how fast or slowly other processes execute, and even if they stop executing permanently. (See M. Herlihy. Wait-free synchronization. *ACM Transactions on Programming Languages and Systems*, 13(1):124-149, January 1991.) Such strong progress guarantees are attractive, but often very difficult to achieve. Most wait-free techniques in the literature are too complicated and too expensive to be useful in practice.

A lock-free implementation guarantees that, starting from any state in which one or more processes are executing operations, some process will complete its operation within a finite number of steps. This weaker progress condition usually makes lock-free implementations easier to design than wait-free ones. Simple and practical lock-free implementations have been achieved for a small number of important data structures, such as stacks, queues, and work-stealing deques. Lock-freedom has generally been regarded as acceptable because well known contention management techniques such as backoff are effective at reducing contention when it arises, thereby achieving progress in practice, despite the lack of the strong theoretical guarantee of wait-freedom. (See A. Agarwal and M. Cherian. Adaptive backoff synchronization techniques. In *Proceedings of the 16th International Symposium on Computer Architecture,* pages 396-406, May 1989.)

Herlihy, Luchangco, and Moir [Herlihy2003A] recently proposed the obstruction-free approach to implementing non-blocking operations for shared data structures. An obstruction-free implementation simply guarantees that a process will complete its operation if it eventually executes enough steps without interference from other processes. Thus, if two or more processes repeatedly interfere with each other, it is possible that none of them completes its operation. The view is that, because contention management techniques are required to achieve acceptable performance when contention arises anyway, it is unnecessary to make any progress guarantees in the case of contention between concurrent operations.

Several examples in the literature suggest that by providing only obstruction-free progress guarantees, significantly simpler implementations can be achieved that are faster in the uncontended case. Furthermore, although an implementation that is obstruction-free but not lock-free will exhibit livelock if contention is ignored, experience shows that livelock can be effectively avoided by using simple contention-management strategies.

Asynchronous and Semisynchronous Models of Computation

Concurrent techniques are usually required to ensure safety properties regardless of how the steps of concurrent processes are interleaved, and (therefore) regardless of how fast or slowly any process executes. In other words, these techniques should be proved safe in an asynchronous model of computation, in which the steps of processes are scheduled by an adversarial scheduler that can perform many steps of a process consecutively or perform them arbitrarily far apart. In such a model, it is impossible for a process to determine whether another process has crashed (i.e., stopped executing) or is just running very slowly.

Of course, in reality, there are limits to how fast or slowly processes can run. Some techniques exploit assumptions about these limits to improve in various ways on techniques designed for an asynchronous model. Such techniques are analyzed in synchronous or semisynchronous models of computation that embody timing assumptions made about the target execution environment.

In a synchronous model, all processes execute steps at the same rate (until they crash). This means that if a process does not perform a step when it should, other processes can detect that it has crashed. However, if the correctness of a particular technique depends on all (non-crashed) processes performing steps precisely at a given rate, then tiny variations in execution rate, for example due to one processor becoming warmer than another, can cause incorrect behavior. Consequently, such techniques are not generally practical.

Semisynchronous models relax these timing requirements, allowing processes to execute steps at different rates, and even allowing the rate at which a particular process executes to vary over time. However, it is assumed that there is an upper bound on the relative execution rates of any pair of processes. To be more precise, let us define the maximum step time of an execution as the longest time between the completion times of consecutive steps of any process. We define minimum step time analogously. Semisynchronous models assume that there exists a finite R such that in all executions, the ratio of the maximum and minimum step times is at most R. The evaluation of techniques in semisynchronous models has value for the practitioner because real-world systems satisfy the assumptions of such models, and for the theoretician in understanding the limitations of assumptions on timing.

In the known-bound model, R is known by all processes. (See [Alur1997] R. Alur, H. Attiya, and G. Taubenfeld. Time-adaptive algorithms for synchronization. *SIAM Journal of Computing,* 26(2):539-556, 1997.) This implies that a process can wait long enough to guarantee that every other process has taken another step, or has crashed. Some techniques that depend on knowledge of R can violate safety requirements in systems that do not satisfy the assumed bound. Conservative estimates of the bound for a particular system generally translate into worse performance, so designers are faced with a dangerous tradeoff in using such techniques. Thus, such techniques are not easily portable and indeed may violate safety properties in a given system if the system stops satisfying the timing assumptions, for example due to increased temperature.

In the unknown-bound model [Alur1997], R is not known to processes. Thus, in contrast to the synchronous and known-bound models, a process does not know how long to wait to ensure that every other process that has not crashed takes a step. Therefore, it is not possible for a process to detect that another process has crashed. Nonetheless, it is possible for applications to wait for increasingly longer periods, and to exploit the knowledge that eventually all non-crashed processes have taken a step during one of these periods. It has been shown that an application that is correct in this model does not violate any of its safety properties even in an asynchronous model, although progress properties proved in the unknown-bound model may not hold in an asynchronous model.

Applications that are correct in an asynchronous model are nonetheless sometimes analyzed in a synchronous or semisynchronous model, thus allowing the analysis to depend on various timing assumptions. Because contention management techniques such as backoff fundamentally rely on operations waiting for some time before retrying, they cannot be meaningfully analyzed in an asynchronous model of computation, which has no notion of time whatsoever.

In this description, we show how to transform any obstruction-free implementation into one that guarantees that every process performing an operation eventually completes the operation, when analyzed in the unknown-bound model. Thus, the resulting application is safe to use in any non-real-time application, and guarantees that every operation eventually completes in any practical system.

Our Transformation

We begin by explaining some simple ways of ensuring progress for each operation under various different assumptions and models. These ideas motivate the techniques used in our technique, and explain why they are needed under the weak assumptions of the unknown-bound model.

First, if we assume that processes never crash, then it is easy to ensure progress, even in an asynchronous model. This is achieved by ordering operations using timestamps, and having each process wait until all earlier operations in this order have completed before performing the steps of its own operation. This ensures that operations do not encounter contention with concurrent operations while executing the original obstruction-free technique, so every operation eventually completes. However, if a process does crash while it has a pending operation, no operations with later timestamps can be executed.

In a synchronous model, if all processes know an upper bound B on the number of consecutive steps that must be taken by a process to ensure that its operation completes, then it is easy to guarantee that each operation completes, even if processes can crash. The idea is, again, to order operations using timestamps and to have processes refrain from executing their operations while operations with earlier timestamps are pending. However, unlike in the asynchronous model, a process can detect if another process crashed while executing its operation: if the operation is not completed within B steps, then the process executing it must have crashed. In this case, a process can execute its operation when every operation with an earlier timestamp has either completed, or will not interfere further because the process executing it has crashed.

A similar approach works in the known-bound model. In this case, a process that is waiting for an earlier operation than its own to complete must conservatively assume that it is executing its steps at the maximum speed allowed by the model relative to the speed of the process executing the earlier operation. Thus, in this model, a process must wait for RB steps in order to be sure that another process has had time to execute B steps, where R is the ratio of the maximum and minimum step times.

However, this technique does not work in the unknown-bound model because the bound R is not known to processes. In fact, in this model, it is impossible for one process to determine that another process has crashed. Nonetheless, ideas similar to those described above can be used to guarantee that each operation executed by a process that does not crash will complete even in the unknown-bound model. The key idea is that, rather than delaying for an amount of time that is known to be long enough to allow another process to take B steps, a process can delay for increasingly long periods of time while an earlier operation has not completed.

Each time a process performs b steps of its operation, for some constant b, it increases a counter. This serves the dual purposes of demonstrating that it has not crashed, and therefore must be deferred to by later operations, as well as increasing the number of steps for which later operations must defer. After a process has waited the required number of steps for an earlier operation that has not been completed and whose counter has not been increased, it assumes that the process performing the earlier operation has crashed. Consequently, it removes the timestamp of that operation from the order of operations under consideration and proceeds.

In case the process executing the earlier operation has, in fact, not crashed, it reinstates its operation into the order (using its original timestamp). With this arrangement, if a process does crash while executing an operation, then it is removed from consideration and does not prevent progress by other operations. On the other hand, if an operation fails to complete because others did not wait long enough, then they will wait longer next time, so the bound provided by the model ensures that eventually they will wait long enough and the operation will complete.

It is important to note that the worst-case bound R for a particular system might be very high, because a process might occasionally take a very long time between two steps. However, the application has no knowledge of the bound, so the bound does not affect the performance of the application; only the particular execution behavior does. Furthermore, even if an unlikely sequence of events causes progress to take a long time, this has no bearing on how the application behaves in the future. In practice, processes run at approximately the same speed most of the time. Therefore, the effective bound will generally be small, even if, in theory, the actual bound is very large.

This description captures the key idea about how we transform implementations to provide progress guarantees in the unknown-bound model. However, because this strategy essentially amounts to eliminating concurrency, it would not be practical if simply used as described. Therefore, our transformation does not employ this strategy until some process determines that it has executed the original operation too long without making progress.

The application produced by applying our transformation to an obstruction-free application OFApp (which may include a contention manager) is shown in Table 1. We now describe the transformed application in more detail. The PANIC flag is used to regulate when the strategy to ensure progress should be used. Referring to both Table 1 and the flow chart illustrated in FIG. 2, when a process invokes an operation, it first checks this flag (N1; step 204) and, if it is not set (i.e., has the value FALSE), executes up to B steps of its original application (N2; step 208), where B is a parameter of the transformation. If these steps are sufficient to complete its operation, the process simply returns (N3-N4). Observe that if every operation completes within B steps, then the PANIC flag remains unset (FALSE), so the transformed application behaves exactly like the original one, except that it must read one variable, which is likely to be cached. Thus, by choosing B appropriately, we ensure that our transformation introduces very little overhead, if the original contention manager is effective.

TABLE 1

Figure 2:
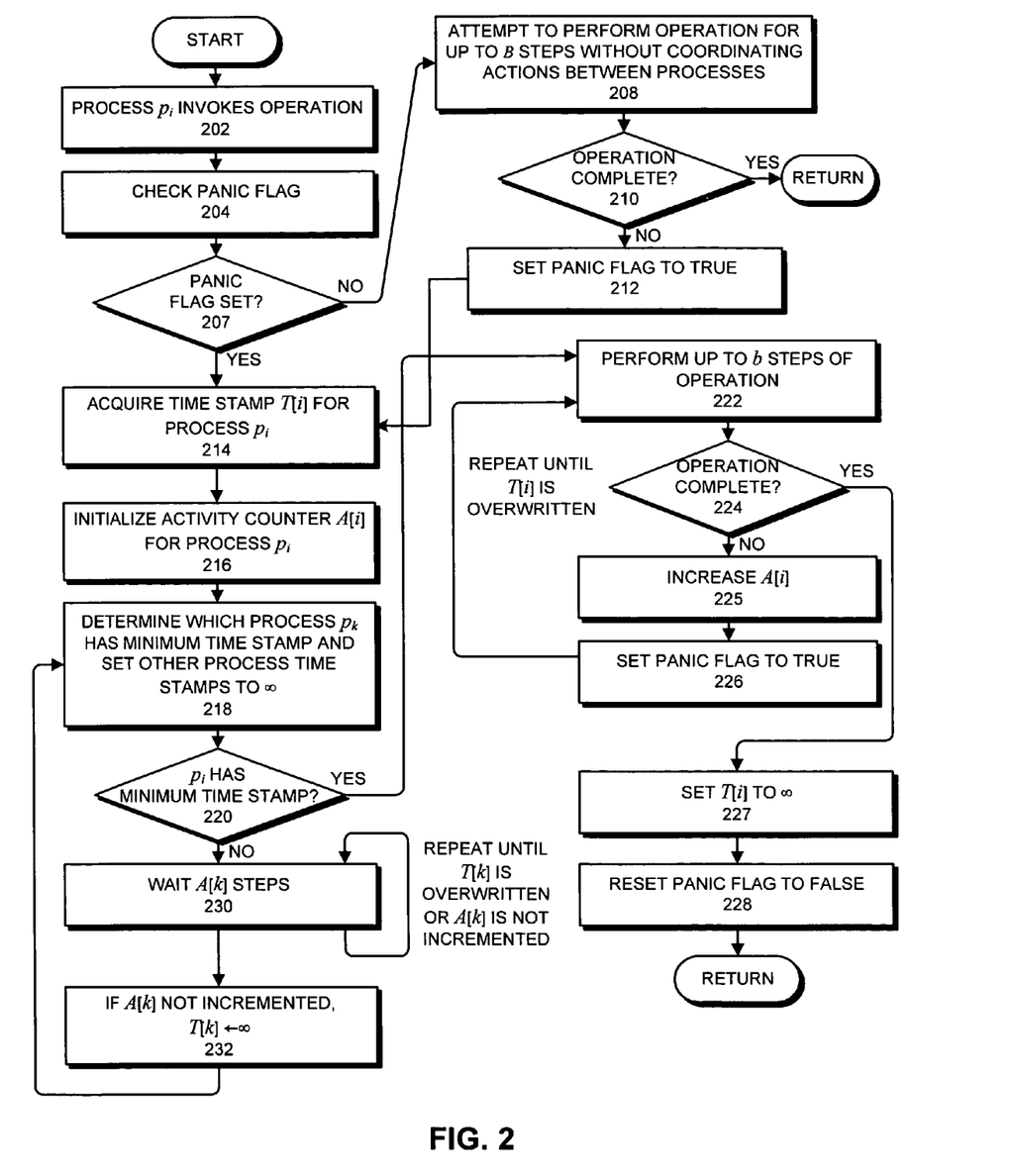
FIG. 2 presents a flow chart illustrating how an invoked operation is executed by a process in accordance with an embodiment of the present invention.

```
invoke(op)
N1:     if ¬ PANIC
N2:         execute up to B steps of OFApp
N3:         if op is complete
N4:             return response
N5:     PANIC ← TRUE
        //panic mode
P1:     t ← fetch-and-increment(C)
P2:     A[i] ← 1
        repeat
P3:         T[i] ← t
            //find minimum time stamp; reset all others
P4:         m ← t
            k ← i
P5:         for each j ≠ i
P6:             s ← T[j]
P7:             if s < m
P8:                 T[k] ← ∞
P9:                 m ← s
                    k ← j
                else
P10:                if(s<∞) T[j] ← ∞
P11:        if k = i
            repeat
P12:            execute up to b steps of OFAlg
P13:            if (op is complete)
P14:                T[i] ← ∞
P15:                PANIC ← FALSE
P16:                return response
P17:            A[i] ← A[i] + 1
P18:            PANIC ← TRUE
P19:        until (T[i] = ∞)
            else
            repeat
P20:            a ← A[k]
P21:            wait a steps
P22:            s ← T[k]
P23:            until a = A[k] or s ≠ m
P24:            if (s = m) T[k] ← ∞
P25:    until (op is complete)
```

If its operation fails to complete within B steps, the process sets the PANIC flag (to have the value TRUE) (N5; step 206). Thereafter, until the flag is reset, all new operations see that the PANIC flag is set (to have the value TRUE) and begin to participate in the strategy to ensure progress (P1-P25).

A process $p_i$ participating in this strategy first acquires a timestamp (P1; step 214), initializes its activity counter A[i] (P2; step 216), and then repeats loop P3-P25 until its operation is complete. In each iteration of this loop, the system first determines which process $p_k$ has the minimum time stamp and sets all other time stamps to ∞ (step 218). To accomplish this, each process $p_i$ announces its timestamp in T[i] (P3) and then searches for the minimum (i.e., oldest) timestamp announced by any process. All timestamps that are not ∞, but are larger than the minimum timestamp it observes, are replaced by ∞ (P4-P10).

If $p_i$ determines that it has the minimum timestamp (P11), then it repeatedly takes up to b steps of the original application (P12; step 222) (where the constant b is a parameter of the application), increases its activity counter (P17; step 225), and sets the PANIC flag (to have the value TRUE) (P18; step 226). Note that the PANIC flag may have been unset (to have the value FALSE) because some other process completed its operation (P15). Setting the PANIC flag (to have the value TRUE) ensures that new operations continue to participate in the strategy to ensure progress. Process $p_i$ repeats these steps until either its operation finishes (P13-P16) or some other process overwrites its timestamp with ∞ (P19). The latter case indicates that this other process has read an older timestamp (P8, P10) or thinks that $p_i$ may have crashed (P24). On the other hand, if $p_i$ finishes its operation, it sets T[i] to ∞ (P14; step 227), unsets the PANIC flag (to have the value FALSE) (P15; step 228), and returns from the invocation.

If process $p_i$ determines that some other process $p_k$ has the minimum timestamp (P11), then $p_i$ enters loop P20-P23. During each iteration of this loop, $p_i$ reads $p_k$'s activity counter A[k] (P20) and waits for the indicated number of steps (P21; step 230). If $p_k$'s timestamp is overwritten during this period of time, then either $p_k$ has completed its operation, another process thought that $p_k$ had crashed, or another process saw an operation with a smaller timestamp. In this case, $p_i$ exits the loop (P23). If $p_k$'s timestamp is not overwritten by another value and $p_k$ does not increase its activity counter during the period of time while $p_i$ was waiting at line P21, then $p_k$ may have crashed, so $p_i$ exits the loop (P23) and overwrites $p_k$'s timestamp with ∞ (P24; step 232). The system then returns to step 218. In doing so, the process $p_i$ sets T[i] again to have its time stamp. Note that each process remembers its time stamp, and this memory is not wiped out when other processes set T[i] to infinity. Process $p_i$ uses this "remembered" time stamp to restore its timestamp T[i] when process $p_i$ transitions from step 232 to step 218.

We now informally explain why our strategy ensures a guarantee of progress. Eventually, in every iteration of loop P3-P25, process $p_i$ enters loop P12-P19. Meanwhile, other processes determine that $p_i$'s timestamp is the minimum and wait for a number of steps indicated by $p_i$'s activity counter A[i]. If $p_i$ doesn't complete its operation within b steps, then it increases its activity counter A[i]. Eventually, no process resets T[i] to ∞, and A[i] becomes large enough so that each process executing loop P20-P23 waits long enough at P21 so that $p_i$ increases A[i] during this period. Thus, eventually, all other active processes remain in loop P20-P23, so no process except $p_i$ executes steps of the original application. Hence, obstruction freedom guarantees that $p_i$ eventually completes its operation.

On the other hand, if $p_i$ crashes, then the other processes will no longer see A[i] change, will stop waiting for $p_i$, and will overwrite its timestamp with ∞. Then the way is clear for the next operation in timestamp order (if any) to make progress.

An important feature of the transformed implementation is that, if the original contention manager is occasionally ineffective, causing the PANIC flag to be set, the PANIC flag will be reset and normal execution will resume, provided the original contention manager does not remain ineffective. To see this, recall that every operation by a non-crashed process eventually completes, and note that each operation either sees that PANIC is unset (has the value FALSE) and does not set it (N1), or unsets PANIC (to have the value FALSE) before returning (P15). Furthermore, PANIC is set (to have the value TRUE) only by an operation that has executed either B or b steps of the original application (including the original contention manager) without completing. Thus, with appropriate choices for B and b, we ensure that our mechanism continues to be invoked only if the original contention manager continues to be ineffective.

Note that a number of aspects of the exemplary code that appears in Table 1 can be modified. For example, the choice of specific values for B and b can depend on the particular operation being executed (and the process executing it). Hence, the parameters B and b do not have to be a constant parameter of the transformation. The only requirement is that there is some upper bound for B over all operations. Note that a process can raise the PANIC flag earlier if it finds that it is encountering too much contention, so B is just a worst-case bound, and should be chosen conservatively. Furthermore, it is desirable for the value of b to be constant for each operation. That is, once b is chosen for a particular operation, it should use the same value of b throughout. Though again, b is an upper bound; the process may choose to execute fewer steps of OFAlg, as long as it executes at least one step.

We can also allow A[i] to be initialized (on line P2) with any value, and the choice of what value to use may depend on the operation. Also, at line P17, the process may increase its activity counter by any amount, as long as it increases it. (In the case where the activity counter is an integer, the process has to increase by at least 1.)

Concluding Remarks

We have shown that any obstruction-free application can be transformed into a new application that is wait-free when analyzed in the unknown-bound semisynchronous model of computation. Our transformation can be applied to an obstruction-free implementation, together with any valid contention manager, and the transformed implementation behaves like the original as long as the chosen contention manager is effective. Because real-world systems satisfy the assumptions of the model we consider, our result shows that obstruction-free applications and ad hoc contention managers can be used in practice without sacrificing the strong progress guarantees of wait-freedom.

Our result can easily be made stronger from both practical and theoretical points of view. First, as presented, our transformation introduces the need to know of the maximum number of processes that use the implementation. However, this disadvantage can easily be eliminated using results of Herlihy, Luchangco and Moir. (See M. Herlihy, V. Luchangco, and M. Moir. Space- and time-adaptive nonblocking algorithms. In *Proceedings of Computing: The Australasian Theory Symposium* (CATS), 2003.) From a theoretical point of view, our use of the fetch-and-increment can be eliminated by using standard time stamping techniques based on an array of single-writer-multiple-reader registers. Thus, our transformation is applicable in a wide range of shared memory systems, as it does not depend on any special support for synchronization.

Furthermore, because we can replace the fetch-and-increment with time-stamping techniques based on registers, it is possible to apply our transformation to truly distributed systems without shared memory. Note that existing techniques make it possible to implement shared memory on a distributed, message-passing system as long as not more than half the processes are faulty.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for ensuring progress is made in a system that supports concurrent execution of operations by multiple processes, comprising:
    if a progress-ensuring strategy is presently in effect, serializing execution of operations in the system into an order of operations in a manner that ensures that non-failed operations eventually complete by removing an operation performed by a process that is assumed to have failed from the order of operations under consideration so that the removed operation does not prevent progress by other operations; and
    if the process performing the removed operation has not failed, the process reinstates the removed operation into the order of operations under consideration.

2. The method of claim 1, wherein the operations are obstruction-free.

3. The method of claim 1, wherein substantially serializing execution of operations involves:
    assigning timestamps to operations;
    using timestamps to identify a particular one of the operations that is currently preferred for execution; and
    attempting to prevent execution of non-preferred operations while the preferred operation completes.

4. The method of claim 1, further comprising determining whether the progress-ensuring strategy is currently in effect.

5. The method of claim 4, wherein the determining whether the progress-ensuring strategy is currently in effect involves observing a panic flag.

6. The method of claim 5, further comprising setting the panic flag in response to an indication that contention is impeding progress.

7. The method of claim 6, wherein the indication comprises a number of steps of the operation having been executed without the operation completing.

8. The method of claim 6, wherein the indication comprises an amount of time having passed without the operation completing.

9. The method of claim 5, wherein, after observing the panic flag is set, a process unsets the panic flag upon completing an operation.

10. The method of claim 3, wherein the attempting to prevent execution of non-preferred operations involves causing non-preferred operations to delay themselves for an amount of time indicated by the preferred operation.

11. The method of claim 10, wherein the preferred operation repeatedly increases the amount of time indicated for non-preferred operations to delay.

12. A computer-readable storage medium storing instructions that when executed by a computer cause the computer to perform a method for ensuring progress is made in a system that supports concurrent execution of operations by multiple processes, the method comprising:
    if a progress-ensuring strategy is presently in effect, serializing execution of operations in the system into an order of operations in a manner that ensures that non-failed operations eventually complete by removing an operation performed by a process that is assumed to have failed from the order of operations under consideration so that the removed operation does not prevent progress by other operations; and
    if the process performing the removed operation has not failed, the process reinstates the removed operation into the order of operations under consideration.

13. The computer-readable storage medium of claim 12, wherein the operations are obstruction-free.

14. The computer-readable storage medium of claim 12, wherein substantially serializing execution of operations involves:
    assigning timestamps to operations;
    using timestamps to identify a particular one of the operations that is currently preferred for execution; and
    attempting to prevent execution of non-preferred operations while the preferred operation completes.

15. The computer-readable storage medium of claim 12, further comprising determining whether the progress-ensuring strategy is currently in effect.

16. The computer-readable storage medium of claim 15, wherein the determining whether the progress-ensuring strategy is currently in effect involves observing a panic flag.

17. The computer-readable storage medium of claim 16, further comprising setting the panic flag in response to an indication that contention is impeding progress.

18. The computer-readable storage medium of claim 17, wherein the indication comprises a number of steps of the operation having been executed without the operation completing.

19. The computer-readable storage medium of claim 17, wherein the indication comprises an amount of time having passed without the operation completing.

20. The computer-readable storage medium of claim 16, wherein, after observing the panic flag is set, a process unsets the panic flag upon completing an operation.

21. The computer-readable storage medium of claim 14, wherein the attempting to prevent execution of non-preferred operations involves causing non-preferred operations to delay themselves for an amount of time indicated by the preferred operation.

22. The computer-readable storage medium of claim 21, wherein the preferred operation repeatedly increases the amount of time indicated for non-preferred operations to delay.

23. A computer system that ensures progress is made and that supports concurrent execution of operations by multiple processes, comprising:
    a processor;
    a memory; and a progress-ensuring mechanism, wherein if a progress-ensuring strategy is presently in effect, the progress-ensuring mechanism serializes execution of operations in the system into an order of operations in a manner that ensures that non-failed operations eventually complete by removing an operation performed by a process that is assumed to have failed from the order of operations under consideration so that the removed operation does not prevent progress by other operations;

wherein if the process performing the removed operation has not failed, the progress-ensuring mechanism allows the process to reinstate the removed operation into the order of operations under consideration.

\* \* \* \* \*